Jan. 5, 1943.　　　J. L. CREVELING　　　2,307,025
ELECTRIC REGULATION
Original Filed May 6, 1938　　2 Sheets-Sheet 1
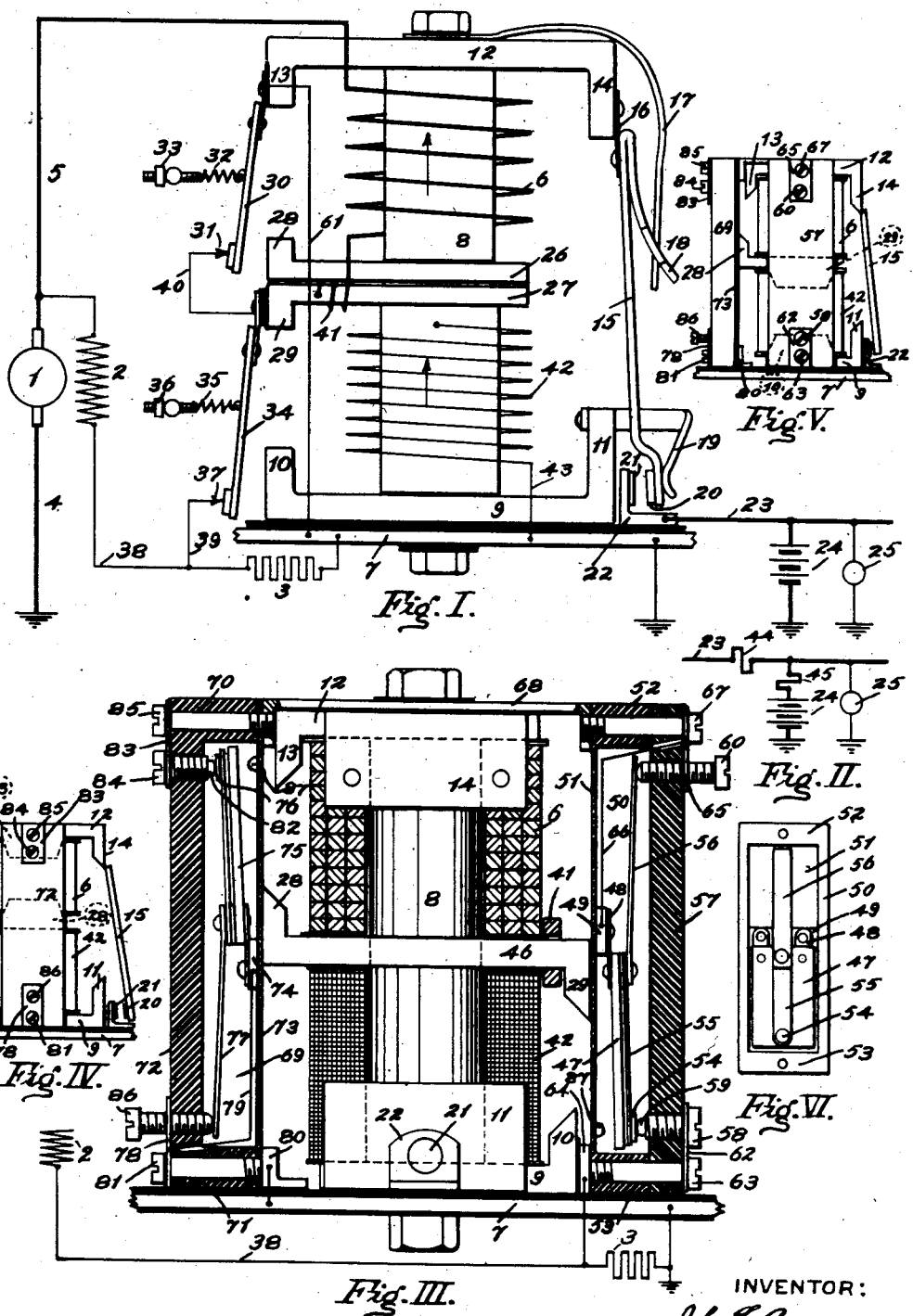
Fig. I.
Fig. II.
Fig. III.
Fig. IV.
Fig. V.
Fig. VI.
INVENTOR:
John L. Creveling Jan. 5, 1943.   J. L. CREVELING   2,307,025
ELECTRIC REGULATION
Original Filed May 6, 1938   2 Sheets-Sheet 2
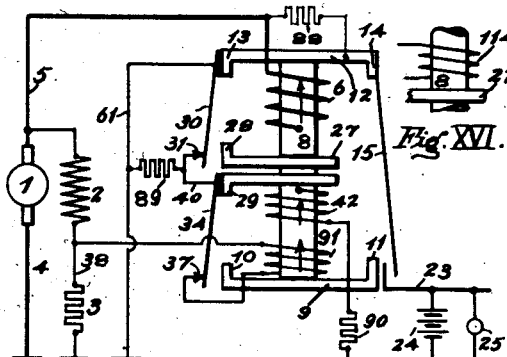
Fig. VII.
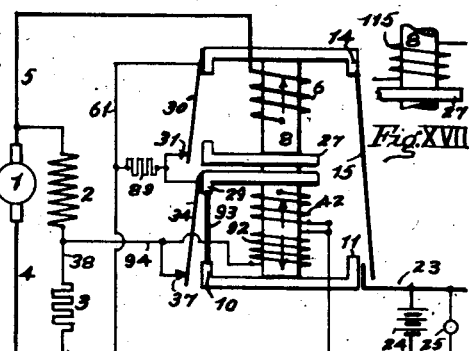
Fig. VIII.
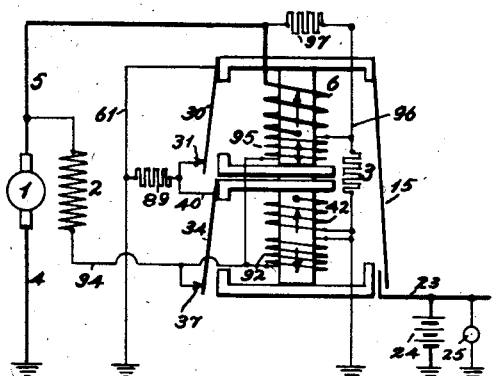
Fig. IX.
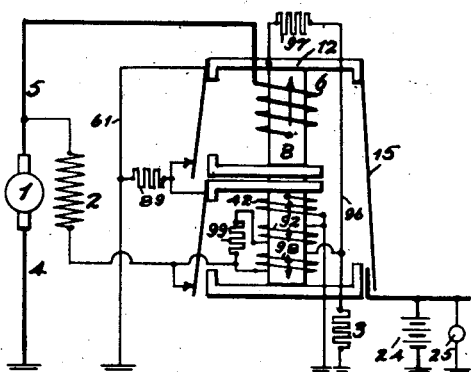
Fig. X.
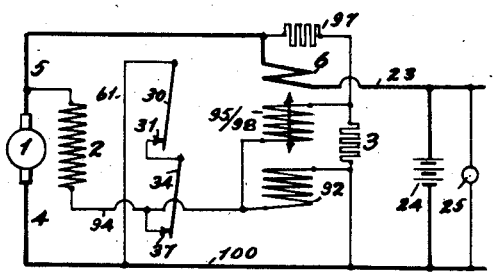
Fig. XI.
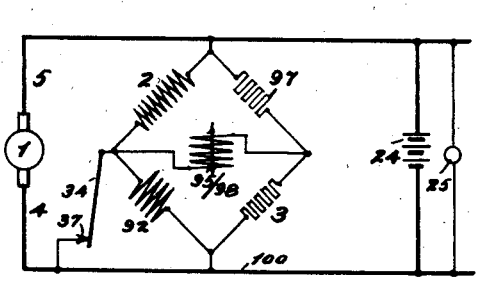
Fig. XII.
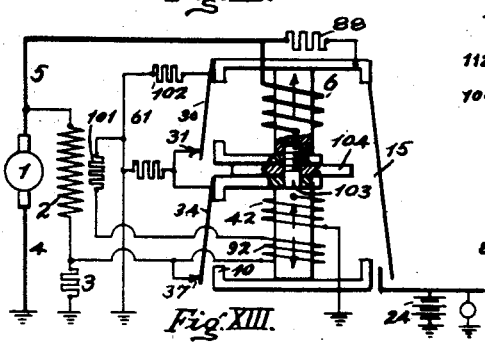
Fig. XIII.
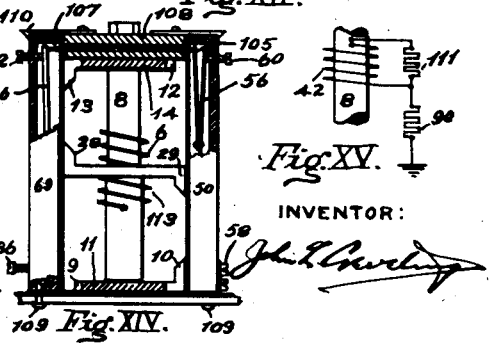
Fig. XIV.
INVENTOR:

2,307,025

UNITED STATES PATENT OFFICE 2,307,025

ELECTRIC REGULATION

John L. Creveling, near Tucson, Ariz.

Continuation of application Serial No. 206,463, May 6, 1938. This application August 3, 1940, Serial No. 350,375

17 Claims. (Cl. 171—314)

My invention pertains to that class of electric regulation wherein a dynamo or generator is to be regulated automatically in a predetermined manner throughout a wide variety of changeable conditions, and also comprehends means whereby it will be automatically connected with and disconnected from its work under certain predetermined conditions.

As my invention is particularly applicable to an electric system wherein a dynamo driven intermittently and at widely varying speeds is employed to charge a storage battery and operate lamps or other translating devices which are supplied by the battery when the generator speed and consequent voltage are below the values necessary to supply current to its load, it will be described with respect to such a system.

Obviously, such systems are especially useful for supplying current to the many electrical devices now carried by moving vehicles and wherein a dynamo or generator is driven by connection with an element deriving its motion from that of the vehicle or from the power plant propelling the vehicle.

As vehicles covered generally by the term "automobile" have at the present time the widest demand for this type of system, my invention will be described with particular reference to such an application thereof.

In so far as common subject-matter is disclosed, this application is a continuation of my application for improvement in Electric regulation, Serial No. 206,463, filed May 6, 1938.

An object of my present invention is to provide a combined regulator and automatic switch wherein the same parts may operate both instrumentalities and thereby make for simplicity and cheapness of manufacture.

Another object is to provide a regulator which will automatically control the voltage of the generator in a predetermined manner under widely varying conditions of speed and load.

Another object is to provide a regulator which will automatically control the current of the generator in a predetermined manner under certain widely varying conditions of operation.

Another object of my invention is to provide a regulator which will be capable of automatically providing substantially independent current and voltage regulation.

Another object of my invention is to provide a regulator which may automatically cause desired changes in the voltage or current regulating characteristics depending upon conditions that vary during the operation of the system.

Another object of my invention is to provide a regulator which will automatically prevent the generator from being overloaded.

Another object of my invention is to provide a regulator which will prevent the generator voltage from exceeding a desired limit on open circuit or with load, regardless of excessive speed.

Another object is to provide a regulator which will automatically control the generator to charge a storage battery in a desired manner, depending upon the instant requirements of the battery.

Another object of my invention is to cause a regulator of the vibrating contact type to maintain the voltage or current delivered by a generator steady or without undesirable fluctuation or pulsation.

Other objects of my invention will be pointed out in the following specification or will be apparent from the constructions and operations described therein.

In the drawings, like numerals refer to like or corresponding parts, and Fig. I is a diagrammatic representation of one type of structure comprehended by my invention, in which certain parts have been transposed for ease in illustration, as will hereinafter be explained. Fig. II is a diagram showing a modification that may be made in the system indicated in Fig. I. Fig. III is a partial elevation and partial section of one type of preferred structure used in practicing my invention, certain parts being omitted for ease in illustration. Fig. IV is a side elevation of the structure of Fig. III, in which certain parts are omitted or shown in simplified form for ease in illustration. Fig. V is an elevation of a structure similar to that of Figs. III and IV, showing different positions which may be occupied by certain of the major parts. Fig. VI is an elevation of a portion of one of the elements shown in Figs. III, IV and V. Figs. VII, VIII, IX and X are diagrammatic representations of systems illustrated in the manner employed in Fig. I, and including modifications comprehended by my invention. Figs. XI and XII are diagrams employed to illustrate the operation of the system of Figs. IX and X. Fig. XIII is a diagrammatic representation of a system including a modification falling within my invention. Fig. XIV is a partial elevation and partial section of a structure somewhat similar to that of Fig. III, but having a different mode of operation, which may be used in employing my invention. Fig. XV is a diagrammatic representation of a modification which may be incorporated in any of the systems illustrated in the preceding diagrams. Figs. XVI and XVII illustrate modifications of windings falling within my invention.

Referring particularly to Fig. I, 1 represents a dynamo or generator which may be intermittently driven at various speeds and which is shown as provided with the usual field coil 2. One end of the coil 2 is shown as connected by wire 38 with one terminal of the resistor 3, having its other terminal connected with the base 7 of conducting material, upon which the combined regulator and switch of my invention is mounted, and which is grounded as indicated. The lower lead 4 from the dynamo, which in all the diagrams will be considered as the negative, is also connected to ground, as indicated, while the positive lead 5 is carried to one end of the series coil 6, wound upon the upper portion of the core 8, of iron or other suitable magnetic material. The core 8 rests upon the member 9, of iron or other suitable magnetic material, which is carried by the base member 7 and insulated therefrom, as indicated. The member 9 is indicated as provided with upturned extensions or pole pieces 10 and 11, while the upper end of the core 8 is shown as provided with a magnetic member 12 having at its extremities the downwardly turned extensions or pole pieces 13 and 14, here indicated as directly over the pole pieces 10 and 11 of the lower member 9. The extension 14 is shown as carrying a movable armature 15 attached thereto as by the flexible strip 16, and normally urged in a right-hand direction by the leaf spring 17 engaging one wall of a slot in the bent extension 18 of the armature 15. Movement of the armature by the spring 17 is limited by the stop 19, of nonmagnetic material, which may be bent for the purpose of adjustment, while the effect of the spring may be adjusted by bending the member 18. The armature 15 has its lower free end separated from the pole piece 11 by a suitable air gap and is provided with a contact member 20, adapted to form a low resistance contact with the member 21, carried by the insulated conducting member 22, when pressed against the same. Member 22 is shown as in electrical connection with wire 23, which is carried to the positive terminals of the battery 24 and the load indicated at 25, which have their negative terminals connected to ground as indicated. The core 8 is shown as provided at substantially its mid-portion with two magnetic members 26 and 27, which are shown as provided with pole pieces 28 and 29. This arrangement is adopted in the diagrams of Figs. I, VII, VIII, IX, X and XIII, as it makes for ease in illustration by allowing the pole pieces 10—11, 13—14 and 28—29, all to be shown in the same plane and by simplifying the wiring; while in the actual apparatus indicated by these diagrams the pole pieces preferably occupy the positions indicated in Figs. III, IV or V, as will hereinafter be more fully pointed out.

In Fig. I, the pole piece 13 is shown as provided with a movable armature 30, which is insulated therefrom and normally urged toward the contact "point" 31 by the spring 32, adjustable as by nut 33. The lower end of armature 30 is provided with a contact member of suitable material for a vibrating regulating contact with the "point" indicated at 31, and is separated from the pole piece 28 by a suitable air gap. The pole piece 29 is shown as provided with an armature 34, insulated therefrom as indicated, and normally urged to swing in a clockwise direction by the spring 35, adjustable as by nut 36. The lower end of armature 34 carries a suitable contact member which, by contact with the contact "point" indicated at 37, limits the movement of armature 34 by spring 35. The contact "point" 37 is shown as electrically connected with the wire 38 at a point between the field coil 2 and resistor 3, as by wire 39, and the armature 34 is shown as electrically connected with the "point" 31, as by wire 40, while the armature 30 is connected with the base 7, and thus to ground as by wire 61. The coil 6 is shown as having its lower end connected, through a small coil 41, with a portion of the magnetic structure including the core 8 and parts connected therewith, and is thus in electrical communication with the switch armature 15. The lower portion of core 8 is shown as surrounded by a relatively fine wire voltage coil 42, having one of its terminals connected with the magnetic frame including the core 8, and thus in electrical communication with the generator through coil 6. The lower end of coil 42 is shown as connected with the base 7, as by wire 43, and thus to ground and with the negative side of the generator 1.

In Fig. II, there is shown a portion of the wire 23 of Fig. I, with a resistor 44 in the main load circuit and a resistor 45 in the battery circuit, either or both of which may be employed, if desired, for a purpose hereinafter to be pointed out.

In Fig. III, which shows one of the preferred forms of actual apparatus comprehended by my invention, as distinguished from the mere diagrammatic portrayal of Fig. I, it will be noted that the magnetic member 46 attached to the mid-portion of core 8 carries the polar extensions 28 and 29 at its opposite ends, and therefore performs substantially the same office as the members 26 and 27 of Fig. I would if member 27 were revolved through 180 degrees about the core 8, and provided the pole piece 10 could also be moved into its proper relative position under pole piece 28. However, as this would interfere with proper illustration of the switch mechanism, the arrangement shown in Fig. I, which also permits simplification in electrical connections, has been chosen for use in the diagrams for the sake of ease in illustration merely, as previously stated. In Fig. III, it will be seen that in order that the pole pieces 28 and 29 may occupy the positions shown, without interfering with the switch, the polar extensions 11 and 14, carried by members 9 and 12, occupy positions at right angles to their positions indicated in Fig. I, while the switch armature is omitted in order to expose parts that would be obscured by the armature 15 if in place. The position of the armature 15 is indicated in Fig. IV, which shows the general arrangement of the parts composing the structure of Fig. III, as viewed from the left. In Fig. III, the armature 47, corresponding to the armature 34 of Fig. I, is united as by a flexible metal strip 48 with the bridge piece of magnetic material 49 carried by the side walls 50 of a box-like structure having a thin bottom 51 and end walls 52 and 53, which parts appear more plainly in Fig. VI. The armature 47 carries a contact member 54, which is preferably mounted at the end of a leaf spring 55 attached to the upper end of the armature by means of a rivet or screw also anchoring one end of the leaf spring 56. The box-like structure is provided with a cover 57 (not shown in Fig. VI) which is preferably cemented to the side and end members 50, 52 and 53, to form a closed and dust-proof box. The cover 57 carries the screw 58 which is provided with a suitable contact "point" 59, adapted to make contact with member 54; while the adjustment screw 60, carried by cover 57, may be caused to press against the upper portion of spring 56 to yieldingly cause pressure upon the contact between 54 and 59. The screw 58 passes through the small metallic strip or plate 62 and is in electrical connection therewith; while the screw 63, passing through a slip hole in the strip 62 and the cover 57 and end wall 53, by being threaded into the member 64, holds the lower end of the box-like structure containing the vibratory contacts, etc., in place and causes electrical connection between plate 62 and the insulated member 64 which is connected with the wire 38, as indicated. At the upper end of the cover 57, the small plate 65 is electrically connected with the member 49 as by wire 66, and with the insulated conducting member 68 as by screw 67, which also holds the upper part of the box-like structure definitely in place.

Upon the left side of Fig. III, there is shown a box-like structure like the one just described, save that the side walls 69 and end walls 70 and 71 are formed integrally with the cover 72, while the thin bottom 73 is cemented against the side and end walls, as indicated. Here, the magnetic member 74 is like the member 49 and carries the armature 75, contact member 76 and spring 77, which are the same as members 47, 54 and 56 in the box-like structure on the other side of the structure. The member 74 is connected with plate 78 as by wire 79, and the plate 78 is electrically connected with the member 80 which is connected to the plate 7 and thus to ground, as indicated, as by screw 81. The contact "point" 82 is connected with the plate 83 as by screw 84, while the plate is connected with the insulated conducting member 68 by screw 85. The effect of spring 77 may be adjusted as by screw 86, and movement of armatures 47 and 75 toward their pole pieces 10 and 13 is limited by stops 87. The box-like structures containing the vibratory contacts are interchangeable and form complete dust-proof units which may be readily removed and replaced if defective, and are shown of different construction on opposite sides of Fig. III merely to illustrate two forms which may be employed.

In Fig. V, the pole pieces 13 and 28 and the box containing the parts cooperating therewith are shown in the same positions as in Fig. III, while the pole pieces 10 and 29 (shown in dotted lines) and the box containing the parts cooperating therewith are shown as in the positions occupied by the pole pieces 11 and 14 and cooperating switch mechanism indicated in Figs. III and IV. In Fig. V, the pole pieces 11 and 14 and switch parts cooperating therewith are shown as in the positions occupied in Fig. I, or in the positions occupied by pole pieces 10 and 29 and their cooperating parts in Fig. III.

The structure diagrammatically indicated in Fig. VII is the same as in Figs. I, III, IV and VI, save that the coil 6 is provided with a shunt 88; the coil 42 is shown as having a resistor 90 in series therewith; a resistor 89 connects the wire 40 with the wire 61; and the lower portion of core 8 is shown as provided with a coil 91 which has one of its terminals in electrical connection with contact "point" 37 and the other with the wire 38.

Fig. VIII indicates a structure similar to that of Fig. VII save that, instead of having the coil 91 of Fig. VII, the lower part of core 8 is provided with a coil 92 having one end connected to ground and the other in electrical communication with wire 38 as by wire 94, and with "point" 37; and the pole pieces 10 and 29 are shown as bridged by a member or strip 93, of magnetic material, whose magnetic reluctance increases with increase in temperature.

Fig. IX indicates an arrangement similar to Fig. VIII, save that coil 95 upon the upper portion of core 8 has been added and connected in series between the field coil 2 and the resistance 3, as by wires 94 and 96; while wire 96 is also connected with the lead 5 as by resistor 97.

Fig. X indicates an arrangement similar to Fig. IX, save that the left-hand end of resistor 97 is connected with the magnetic frame as at 12 and thus a series coil 6, and that coil 98 upon the lower portion of core 8 has been substituted for the coil 95 of Fig. IX, the connections of the coils 95 and 98 otherwise being the same; and a resistor 99 has been inserted in circuit with the coil 92, said resistor being of a type and used for a purpose to be later explained.

Fig. XI is a simplified diagram of the connections and relationship of the field coil 2, resistor 3, coil 92 and the vibratory-contact devices 30—31 and 34—37 with respect to coil 95 of Fig. IX or coil 98 of Fig. X, the return wire 100 being shown in place of the ground return in the previous diagrams.

Fig. XII is a still further simplified diagram showing the arrangement of Fig. XI in the conventional form of a Wheatstone bridge and with the vibrator 30—31 omitted as unnecessary for the operation to be later explained with reference to this diagram.

Fig. XIII indicates an arrangement having a coil and wiring lay-out similar to that of Fig. VIII, save that coil 92 has the resistor 101 in series therewith, while the resistor 102 has been inserted between wire 61 and armature 30. The magnetic structure of this figure differs from any of the others shown in that the upper and lower portions of the core 8 are connected by an isthmus 103, surrounded by a washer or disc 104 of copper or other conducting material.

Fig. XIV indicates a magnetic structure similar to that of Figs. III and IV; but, the box-like structure containing the vibrating armature shown at 47 in Fig. III, not only has the spring 56 as in Fig. III, but a spring 105 attached thereto; while the armature 106, corresponding to 75 in Fig. III, is not provided with a contact device but is adapted, when moved away from its adjustment screw 112 toward pole piece 13, to move the light rod of insulating material 107 passing through the block 108 into contact with spring 105 and reduce the effect of spring 56 upon the contact mechanism affected by the pole pieces 29 and 10. In this figure, the box-like structures are shown as held in place by engaging a pin at the bottom while being engaged by a latch 110 at the top; and a coil 113 is shown as in series with coil 6 and wound upon core 8 instead of coil 41 upon member 27 of Fig. I, or upon member 46 of Fig. III.

Fig. XV shows the coil 42 of Fig. VII not only as having a resistor 90 in series therewith but a resistor 111 in shunt thereto, for a purpose which will later be explained.

Fig. XVI shows a coil 114, similar to coil 91 of Fig. VII, and assumed to have the same circuit connections, but which is wound upon the upper portion of core 8 instead of upon the lower portion as in Fig. VII.

Fig. XVII shows a coil 115 similar to coil 92 of Fig. VIII, and assumed to have the same circuit connections, but which is wound upon the upper portion of core 8 instead of the lower portion of Fig. VIII.

An operation of my invention is substantially as follows:

Referring particularly to Fig. I, if the generator be at rest, the switch contact at 20—21 will be broken and the load 25 may be supplied by the battery 24 in the usual manner. If the generator now be started, current will flow from wire 5 through field winding 2, wire 38, wire 39, contact at 37, armature 34, wire 40, contact at 31, armature 30, and wire 61 to the grounded base 7, from which return will be made to the generator through ground and lead 4. Some current will also flow from wire 38 through resistor 3 to base 7, and thence to the negative side of the generator by way of ground and return lead 4. As the contact devices 30—31 and 34—37 have a very low resistance under these conditions, the resistance 3 is now practically short circuited and the generator field will build up in a well-known manner. Current will also flow from the generator through lead 5, coil 6 and coil 41 to the magnetic structure including the core 8, and thence through coil 42 and wire 43 to the grounded base 7, from which return will be made through lead 4. Assuming that this current through coils 6 and 42 is in such direction as to tend to cause a flux set up by said coils, in the direction indicated by the arrows thereupon, a portion thereof will flow from core 8, through the right-hand portion of member 12, pole piece 14, armature 15, and across the air gap to pole piece 11, and thence through member 9 to the core 8. This flux will cause attraction between the pole piece 11 and the armature 15, and I so adjust the spring 15 and the air gap that when the generator reaches the voltage at which it is desired to connect the generator and battery, armature 15 will be drawn toward pole piece 14 so as to establish contact at 20—21, and thus connect the generator with the wire 23 and the positive terminals of battery 24 and the load, if any, as indicated at 25. If the speed of the generator now be increased, the voltage across coil 42 will tend to increase and also the current in coil 6, and the flux through core 8 and armature 15 will increase and tend to hold the contact at 20—21 under increased pressure, as desired. At the same time, a portion of the flux set up by coil 42 will flow from the pole piece here indicated at 29 to armature 34 and across the air gap to pole piece 10, and thence through member 9 back to core 8, and this will cause attraction between the pole piece 10 and its armature which is opposed by spring 35. If, now, the generator speed continue to increase and if the battery 24 be in a discharged state, or if a heavy load be on the line as at 25, the current supplied by the generator will ordinarily reach the full value desired to have the generator deliver before the voltage desired to hold from being exceeded under other conditions is reached. When this current value is eached, coil 6 will cause the attraction of the armature diagrammatically indicated at 30 in Fig. I (and really constructed and arranged as shown at 75 in Fig. III) to tend strongly to break the contact indicated at 31 in Fig. I (and shown at 76—82 in Fig. III). And, I so adjust the spring indicated at 32 in Fig. I that the armature 30 will break the contact at 31, or so raise the resistance at the contact that much of the field current will have to traverse the resistor 3 and thus cause the generator current to decrease slightly and restore the contact at 31, or decrease its resistance until the current value in coil 6 tends to exceed the limit again, when the above process will be repeated, in a manner now well understood.

If the battery be charged under current control as above outlined, until it approaches a charged state, its voltage will rise and cause the generator voltage to rise and tend to maintain the current output, and I so adjust the spring 35 that, when the maximum voltage desired to have impressed across the coil 42 under these conditions is reached, the attraction between pole piece 10 and armature 34 will break the contact at 37 or greatly increase the resistance thereof, and thus so decrease the current shunted around the resistor 3, as outlined above with respect to the contact at 31, that the voltage of the generator will be held from exceeding this value, and the generator will now become voltage regulated instead of current regulated as before.

As the operation of a vibratory contact regulator, operated either by a current coil or by a voltage coil, is now so well known, since simple independent regulators of this type are now in use in this country by the million, it is not believed necessary to describe the detailed operation of the vibrators indicated in Fig. I, and the effect upon the field in the regulation of the generator, further than to point out features having some particular bearing upon the present invention.

If the generator continue to charge the battery under the above conditions of voltage regulation, its voltage will tend to rise to that of a fully charged battery; and, if coil 42 and its cooperating regulating means be so arranged and adjusted that this value can not be exceeded across the battery, the charging current will gradually fall to a very low value when the battery becomes charged, in a manner now well known in the art. If the generator slow down until its voltage permits a slight back discharge from the battery through the generator, this current will flow through coil 6 in such direction as to oppose the flux due to coil 42, through armature 15 and across the gap to pole piece 11, and cause the switch contact at 20—21 to open and prevent the battery from discharging through the generator, in a well known manner.

It is here again pointed out that Fig. I is merely a convenient form of diagrammatic representation of a system comprehended by my invention, the regulating and switch apparatus of which are preferably as shown in Figs. III, IV and VI, or in a slightly modified form in Fig. V. And, in the operation described above with respect to Fig. I, it has been assumed that the vibratory contact at 30—31 is operated by the current coil 6, and that the contact at 34—41 is operated by the voltage coil 42 independently of each other, while the coils 6 and 42 cooperate with each other in the operation of the switch.

Now, referring to the structure of Fig. III, it will be noted that when the voltage coil 42 is energized, it will tend to set up a flux through core 8, member 12, pole piece 14 and armature 15 (indicated in Fig. IV) to pole piece 11, tending to close the switch, as outlined with respect to Fig. I; and it will be plain that coil 6 will cooperate with coil 42 in the operation of the switch, in the manner stated with reference to Fig. I, It will also be plain that part of the flux set up by voltage coil 42 will flow through the right-hand portion of member 46 and pole piece 29, and thence through the thin insulating partition or bottom 51 of the box containing the vibratory regulating device (which partition is as thin as practicable at this point so as to serve as means for insulating member 49 with as little reluctance as possible), and thence through armature 47 and across the air gap, including a portion of wall 51, to the pole piece 10. This flux will attract the armature 47 and thus manipulate the contact at 54—59, in the manner stated with regard to armature 34 and contact at 37 in Fig. I. It will also be plain that energization of the current coil 6, if sufficiently strong, will tend to set up a flux through member 12 and pole piece 13, which will cross the air gap and traverse armature 75 and member 74 and the thin partition 73 to pole piece 28. This will cause attraction between pole piece 13 and armature 75 to manipulate the contact at 76—82 to perform current regulation, as pointed out with respect to the contact at 30—31 in the operation described with respect to Fig. I.

It will here be noted that the current and voltage vibrators are alike and enclosed in dust-proof and practically air-tight boxes which are interchangeable. These are valuable features as very small particles of dust are always apt to enter through the joint formed between the base and any kind of cover used to enclose the entire apparatus, and interchangeability permits service stations to replace any of the vibrators while carrying only one kind in stock. Further, the vibrators are automatically connected into circuit when placed in proper positions and their holding screws 63—67 and 81—85 properly drawn up in their respective threaded members.

Another useful feature resides in the fact that the current or voltage values to be maintained may be very accurately adjusted by the screws 86 and 60 without disturbing the arrangement of the contact devices which may be assembled in their dust-proof boxes and tested at the factory and which can be kept in stock, ready for instant use, without danger of contamination by corrosion, oil or dirt. Further, original factory supplied parts can readily be enclosed and sealed in the box structures, which are easily identifiable, and easily so constructed that operating parts can not be removed and replaced without destroying the structure.

By properly proportioning the parts of the magnetic elements including the core 8, yokes, pole pieces and armatures, and by properly proportioning the coils 42 and 6 in the apparatus indicated in Figs. III, IV and VI or in Fig. V, I find it possible to cause the coils to cooperate in operating the switch while still capable of operating their respective regulating contacts substantially independently, while the voltage may be adjusted in response to various current conditions as may be desired. For example, it will be noted that in Fig. I the voltage coil 42 is shown as connected across the magnetic structure and the grounded base, and that the generator is connected with the magnetic structure through coil 6 and coil 41, and therefore, the coil 42 will cause the instant voltage standard of the generator to be raised to compensate for voltage drop due to the resistance of the generator lead 5 and coils 6 and 41. Further, coil 41 may be so wound as to oppose the flux of coil 42 and thus cause the voltage controlled by coil 42 to remain substantially constant if it has a tendency to drop, or to rise, if desired, with increase in current, or it may be so wound as to cause the opposite effect, if this be desired, while, of course, it may be omitted entirely. In practice, I usually prefer to employ a small coil 41 having only a very few turns so wound as to tend to increase the voltage with the current. For, with this arrangement, line drop may be compensated for and the battery can be charged more rapidly, and when charged the charging current will fall off more rapidly to its minimum value, as desired and now well understood. Further, if desired, the core 8 may be chosen of such dimensions and magnetic characteristics that coil 42 will set up a flux therein of such density that, as coil 6 increases the density upon rise in current, the permeability of the core 8 will decrease and thus cause the voltage to rise, and the effect can either be increased or diminished, as desired, by employment of coil 41 of Fig. III or coil 113 of Fig. XIV. While it is the nature of any vibratory contact regulator of the general type here disclosed to cause slight pulsations in the field current which are more or less "ironed out" by the inductance of the field coils, and slight pulsations in voltage and the current delivered by the generator, as now well understood in the art, these pulsations are usually so rapid and of such low amplitude as not to be objectionable or even noticeable. However, as the resistance of the usual storage battery is very low, the current pulsations are relatively large compared with the voltage fluctuations causing them. And while, in the structure indicated in Fig. III when employed as indicated in Fig. I, the instant steady value of current in coil 6, within the range for which the device is designed, may be caused to have no appreciable effect upon the operation of the voltage regulation until the current value is reached which will cause the regulation to be shifted from voltage to current regulation, any pulsation in the current value in coil 6 will tend to vary the flux threading coil 42, and thus tend to modify the effect of coil 42 upon the regulator, in such manner as to augment the pulsations in voltage. By proper design of the parts of Fig. III, I can reduce this tendency to the point that it may usually be neglected. However, as the present invention includes means for producing exceptionally steady and reliable regulation as well as means for automatically varying the characteristics of the regulation to meet various requirements of the battery and load, several such improvements will be described with respect to the remaining figures of the drawings.

In Fig. II, a resistor 44 is indicated as inserted in the supply line 23, and another is indicated at 45 in the battery circuit. Either or both of these may be employed to overcome the current pulsations from becoming so disproportionate to the voltage pulsations as to appreciably affect the voltage regulation. These resistors may have so low value that the energy loss may be neglected and still wipe out any noticeable disturbance of the voltage regulation by the current coil. In fact, the resistance of the current coil itself, or of the usual wiring, will accomplish this effect sufficiently in many applications. The operation of the system indicated in Fig. VII is similar to that described with respect to Fig. I, save for the following modifications which it is the purpose of this figure to bring out. The current from the generator will not all pass through coil 6 but that portion desired will be shunted away through resistor shunt 88, which may be employed for many obvious purposes, among which is the adjustment of the current value to be limited under different conditions, and, of course, a non-inductive shunt will lessen the amplitude of any current pulsations tending to take place in coil 6. The current controlled contact at 30—31 is shown as shunted by the resistor 89 so that complete breaking of the contact can only reduce the field current in wire 61 to the extent determined by the resistor 89. This, of course, saves the tendency toward sparking and wear upon contact members at 30—31, and is permissible because the current regulator only operates under heavy load, which in turn requires a reasonably strong field at any operating speed to be met, and the resistor is selected on this basis. The contact "point" 37 is here shown as connected with one end of a coil 91 surrounding the lower portion of core 8, and having its opposite end connected with the wire 38. Therefore, the current shunted around the resistor 3 by the vibratory contacts traverses this coil which is wound in such direction that this current assists coil 42 as indicated by the arrows upon the coils. This being the case, coils 42 and 91 work together to operate the voltage regulator and, when contact at 37 is broken, this assistance of coil 91 is withdrawn, and this so increases the frequency of vibration that any noticeable fluctuation in the voltage or current delivered by the generator may readily be avoided by properly proportioning the coils. The coil 42 is shown as having a resistor 90 in series therewith, which may be used for adjusting the effect of the coil or for temperature compensation, if desired. That is, if the drop across the resistor 90 is caused to have a relatively high value compared with that across the coil 42, and if the resistor have practically zero temperature coefficient, the temperature changes to be met in service will have little effect upon the excitation of coil 42, as is now well known in the art. With this arrangement, current in coil 91 will increase and decrease with the current in the field and, therefore, the voltage standard of the regulator will tend to rise slightly with generator speed and fall slightly upon increase in load. But, in cases where this is not desired, coils 42 and 91 can be so proportioned, ordinarily, that this feature may be neglected.

The arrangement shown in Fig. VIII operates in the same general way as that of Fig. VII, save that the magnetic shunt 93, indicated as bridging pole pieces 10 and 29, made of nickel steel or any suitable material the permeability of which falls upon rise in temperature, is so arranged as to compensate for temperature changes which affect coil 42, in a manner now well understood in the art. And the coil 92, having one of its terminals connected to ground and the other with wire 38 as by wire 94, has its operation controlled by the vibratory contacts which are in a circuit in shunt to the coil 92, through electrical connection of wire 94 with "point" 37. With this arrangement, the coil 92 is arranged to oppose coil 42, and, therefore, if the contact at 37 or 31 is opened, the current in coil 92 will be increased and the effect of coil 42 weakened, and the frequency of the vibrator so increased as to lessen or nullify any tendency of noticeable fluctuation in the voltage regulation. With this arrangement, the resistor 3 can be omitted in many cases and, by properly choosing the coil used at 92, its resistance may serve the function of resistor 3.

Since increase in speed is offset by the voltage regulator by increasing the effective resistance of the vibrator circuit, and increase in load is met by decreasing the effective resistance of that circuit, this arrangement has a natural tendency to increase the voltage standard upon increase in speed and to lower the standard upon increase in load. When this adjustment of the voltage standard is desired, it may be regulated by the choice of coils and may be reduced to a usually negligible value if undesirable, by the same method. Further, it will be noted that, since the vibrators are in shunt to the coil 92 and always have some finite resistance, there will always be some current in coil 92 when the generator is running; and, on this account, temperature changes which affect coil 42 will affect coil 92 in the same manner, and as the coils are opposed the temperature effects will tend to cancel out, a very desirable feature.

The operation of the arrangement of Fig. IX is the same as that of Fig. VIII, save as modified by the effect of resistor 97 and coil 95. In Fig. IX, the arrangement of the coils 92, 95 and 6, as well as resistors 3 and 97, are plainly as shown in the diagram, Fig. XI, while the vibrators bear the relation to the said coils, as indicated in Fig. XI where the coil 42 and many other parts are omitted for sake of clearness of illustration. Further, omitting the current coil 6 and the vibrator 30—31 of Fig. XI, for sake of simplicity, the arrangement of Fig. XI in turn may easily be formed into the conventional figure of a Wheatstone bridge, as indicated in Fig. XII, from which it will be plain that the field coil 2 of the arrangement of Fig. IX serves as one of the bridge arms, while coil 92 and the vibrator 34—37, in multiple with each other, form another arm, and the resistors 3 and 97 form the remaining arms, while the coil 95 is across one pair of opposite junctions and the generator is connected to the other pair. It is, therefore, plain that by proper proportioning of coil 92 and resistors 3 and 97 with respect to field coil 2, I can cause the current to equal zero or flow in either direction through coil 95 for a given steady or fixed condition at the voltage controlled contact 34—37.

In one application where I have found the arrangement of Fig. IX very satisfactory in service, the field coil 2 has relatively low resistance and relatively high inductance, and I have used a relatively high resistance coil 92 with a relatively large number of turns and corresponding inductance, and I have used a coil 95 having a relatively few turns, with relatively low resistance and inductance, while the resistors 3 and 97 are non-inductive. Resistor 3 and the resistance of coil 92, of course, have their values determined by the limit that must be reached in reducing the generator field current to avoid excess voltage at any speed to be met with minimum load upon the generator, or with the generator upon open circuit, as the case may be. And in this particular application referred to, I have employed a resistor 97 with such a value as to give a feeble current through coil 95 in a direction to assist coil 6 (as indicated by the upper arrow head) when the generator is running slowly or carrying a heavy load and the field current is at or near its maximum, and a feeble current of about equal value in the opposite direction (lower arrow head) when the generator is running at high speed with a light load and the field current is in the neighborhood of the minimum. This current may always have so little value as to cause negligible effect upon the operation of the voltage regulator if steady, or, if desired, may be of sufficient value to affect the current or voltage regulation under some conditions of load and speed. However, even with current flowing in coil 95 so small as to cause no noticeable effect upon the regulator, if the said current be steady, very slight pulsations caused by vibrator 34—37 will cause pulsations in the coil 95; and, if this coil be properly wound, these pulsations will tend to counteract any pulsation in coil 6 and thus steady the regulating effect of the regulator, which with this arrangement holds a very steady voltage value and has very little tendency to spark at the contacts. While in Figs. XI and XII I have shown one bridge arm as comprising coil 92 and the vibrating contacts in shunt thereto, as illustrated in Figs. VIII, IX and X, it will be obvious that this bridge arm may comprise the vibrating contacts and the coil 91 in series therewith of Fig. VII instead and the same results obtained, the directions of windings in coils 91 and 92, of course, being arranged as set forth in the descriptions of Figs. VII and VIII.

The arrangement shown in Fig. X operates in the same general way as that of Fig. IX, save that the resistor 97 has one terminal connected with the magnetic structure and, therefore, its current passes through coil 6 and the voltage across the resistor will be affected by the drop caused by coil 6, and 97 will thus act as though its resistance were increased slightly as the load on the generator increases; coil 98 is shown as upon the lower portion of core 8 so as to directly affect the voltage regulation; and the coil 92 has its effect modified by the resistor 99 in response to temperature changes at the location of the resistor. With this arrangement, coil 98 is so connected that current flowing through the coil upon high speed and small load (upon weak field) tends to oppose coil 42 and thus increase the voltage and to produce the reverse effect upon low speed or heavy load (strong field) so that the voltage standard may be varied slightly, if desired; while in this case, also, the current in coil 98 may be held at so low a value as to cause negligible difference in the regulation, if steady, and still pulsations in voltage regulation due to action of the vibrator will be nullified, as outlined with respect to Fig. IX. With resistor 97 connected as shown in Fig. X, the drop across coil 6, as current increases, will tend to increase the current in coil 98 or decrease a reverse current if flowing therein upon increase in load, and thus tend to decrease the line voltage held by the regulation. Since current in the coil 92 opposes coil 42, it tends to increase the voltage standard of the regulation and, as temperature increase upon coil 42 has this same effect upon the regulator, the diminution of current in coil 92, as by its own temperature rise, will tend to offset temperature changes in coil 42, as in Fig. IX. If desired, this can be carried further, as by use of the resistor 99, particularly if the resistor have a high temperature coefficient. If the resistor be placed close to the coil 42, as shown in Fig. X, it may be used to help compensate for temperature changes in this coil, or it may be placed in heat receiving relation to some other element whose temperature it is desired to have affect the regulation.

The arrangement indicated in Fig. XIII operates in the same general manner as that of Fig. VIII, save as follows: The resistor 102 is used to cause a larger portion of the field current to flow through coil 92, which coil is in multiple with the vibrator circuit through the resistor 101 which may have a high temperature coefficient and be placed near some instrumentality the temperature of which it is desired to have affect the generator regulation; and the flux for operating the switch has its path restricted by the isthmus 103, surrounded by the disc or secondary 104. In this set up, when resistor 101 is located in heat receiving relation to the generator, as shown for example, the current flowing through coil 92 and opposing the operation of the voltage regulator by coil 42, will be decreased as the generator becomes heated, and the standard of the voltage regulation lowered as the generator temperature rises. And, when the generator is operating, the current in coils 42 and 6 will cause the flux through the switch armature 15 and the isthmus 103 to raise the flux density through the isthmus to such value toward saturation that small fluctuations in current in coil 6 will have very little effect upon the flux threading coil 42. This will tend to overcome any tendency toward slight pulsations in current in coil 6 affecting the voltage regulator in holding a steady voltage value. Further, the conducting ring or washer 104, preferably of copper, will act as a short-circuited secondary tending to damp out fluctuations in the isthmus 103, in a well known manner.

In the structure of Fig. XIV, the magnetic circuits are indicated as in Figs. III and IV, and the core 8 may contain any of the above described arrangements of windings. For sake of ease in illustration, the windings are omitted, save a portion of coil 6 and a coil 113, which may be used in any of the arrangements described above in place of the coil 41 of Figs. I and III, if desired. In this structure, the voltage responsive vibrator (not shown), enclosed in the box having the side wall 50, has the same construction and operation as that in Fig. III, and is the only vibrating contact that is employed. The current responsive armature 106, as indicated within the box having side wall 69, is arranged in the same manner as that in Fig. III, save it is not provided with electrical contacts. When the current in coil 6 reaches the desired maximum value, the armature 106, the position of which may be adjusted as by screw 112, is drawn toward pole piece 13 against the opposition of a leaf spring (not shown) as in Fig. III, and into contact with the very light rod 107, of insulating material, which it presses against the leaf spring 105 to lower the standard of the voltage regulator and prevent this desired current limit from being exceeded, in an obvious manner.

Fig. XV illustrates a means for causing changes in temperature to affect the operation of coil 42 in a manner often desirable. Here, the resistor 111 has a high temperature coefficient and is in shunt to the coil 42, while the resistor 90 having zero temperature coefficient is in circuit between 42 and 111 and the ground. By properly proportioning these elements, increase in temperature in 111 will cause the voltage across coil 42 to be increased, and thus offset the rise in resistance in coil 42 due to temperature rise.

In Fig. XVI, the coil 114, similar to coil 91 of Fig. VII, is indicated as placed upon the upper portion of core 8, where it will tend to counteract pulsations in coil 6 caused by operation of the voltage vibrator, an arrangement which may sometimes be desired.

In Fig. XVII, the coil 115, similar to coil 92 of Fig. VIII is shown as upon the upper portion of coil 8, where it may be placed to oppose inherent pulsations in coil 6, if desired. These coils in Figs. XVI and XVII can, of course, be used in cooperation with the coils shown in Figs. VII and VIII, to effect a common purpose.

From the foregoing it will be seen that I have produced a combined automatic switch and generator-regulator, capable of connecting and disconnecting a generator and battery in the usual manner and providing substantially independent current and voltage regulation, while the standard of voltage may be automatically adjusted to meet various conditions of operation and battery condition, if desired. Further, it will be noted that while I have produced a regulator of the vibratory contact type wherein the current and voltage coils are inductively coupled, I have prevented the current pulsations ordinarily caused by this type of regulator from injuring the steadiness of the voltage regulation.

It will, of course, be obvious that, in systems where large currents are employed, a small device as here indicated may be used by having the switch portion act as a relay for any suitable type of contactor and by having the vibrating contacts control any suitable kind of electrically controlled resistance device in the field of the generator, and that the structure here shown may control the field of an excitor which in turn may control the main dynamo,—which arrangements are now all commonly used and well known in the art.

I do not here limit myself to any of the exact constructions shown nor to any of the particular modes of operation herein described, which have been set forth merely to illustrate a few embodiments of my invention, which is as set forth in the following claims:

1. A combined automatic switch and generator regulator for use in a system employing a variable speed generator and a storage battery to be charged thereby, comprising switch mechanism for connecting and disconnecting the generator and battery, means for regulating the generator, a voltage responsive coil for closing the switch mechanism and affecting the regulating means to control the generator voltage, a current responsive coil for affecting the regulating means to control the generator current and coacting with the voltage coil to affect the switch mechanism and means for adjusting the standard of voltage regulation in response to current changes.

2. A combined automatic switch and generator regulator for use in a system employing a variable speed generator and a storage battery to be charged thereby, comprising switch mechanism for connecting and disconnecting the generator and battery, means for regulating the generator, a voltage responsive coil for closing the switch mechanism and affecting the regulating means to control the generator voltage, a current responsive coil for affecting the regulating means to control the generator current and coacting with the voltage coil to affect the switch mechanism and means for adjusting the standard of voltage regulation in response to changes in the condition of charge of the storage battery.

3. A generator regulator comprising regulating means, voltage responsive means for operating the regulating means and current responsive means for operating the regulating means, said responsive means being adapted to operate the regulating means substantially independently of each other, combined with switch mechanism operated by coaction of the responsive means and means for varying the standard of voltage regulation in response to current changes.

4. In a combined automatic switch and generator regulator having a plurality of vibratory contacts affecting the operation of the generator, a voltage coil for operating one of said contacts to control the generator voltage, a current coil for operating another of said contacts to control the generator current, means whereby said coils cooperate in the operation of the switch, and means for adjusting the standard of voltage regulation in response to current changes.

5. An electric regulator including voltage limiting means, independent current limiting means, said means being operated by coils tending to cause magnetic flux to thread the turns of each other and means for nullifying the transformer effect of one coil upon the other due to current changes in said one.

6. An electric regulator including voltage limiting means, independent current limiting means, said means being operated by coils tending to cause magnetic flux to thread the turns of each other and means for nullifying the transformer effect of one coil upon the other due to current changes in said one, comprising a coil cooperating with one of said coils and subject to current changes of the same frequency as those in said other.

7. A combined automatic switch and regulator comprising a magnet core provided with pole pieces at its ends and a plurality of intermediate pole pieces, a switch operating armature carrying flux between end pole pieces, a current regulating armature carrying flux between an intermediate pole piece and an end pole piece, and a voltage regulating armature carrying flux between an intermediate pole piece and another end pole piece.

8. A combined automatic switch and regulator comprising a magnet core provided with pole pieces at its ends and a plurality of intermediate pole pieces, a switch operating armature carrying flux between end pole pieces, a current regulating armature carrying flux between an intermediate pole piece and an end pole piece, and a voltage regulating armature carrying flux between an intermediate pole piece and an end pole piece, a current winding between an end pole piece and an intermediate pole piece and a voltage winding between an intermediate pole piece and another end pole piece.

9. A combined automatic switch and regulator comprising a magnet core provided with pole pieces at its ends and a plurality of intermediate pole pieces, a switch operating armature carrying flux between end pole pieces, a current regulating armature carrying flux between an intermediate pole piece and an end pole piece, and a voltage regulating armature carrying flux between an intermediate pole piece and an end pole piece, a current winding between an end pole piece and an intermediate pole piece, a voltage winding between an intermediate pole piece and another end pole piece, and means cooperating with one of said windings to modify the inductive effect of the other thereupon.

10. In a system wherein a generator subject to speed changes is employed to charge a storage battery, a regulator having a current coil for alone controlling the generator current and a voltage coil for alone controlling the generator voltage, each of said coils affecting the flux through the other, and means for opposing the transformer effect of rapid current changes in the current coil upon the regulating effect of the voltage coil including an independent coil affected by current changes in step with the first-named changes.

11. A regulator for a generator having a circuit for supplying a battery, comprising a vibratory contact, magnetic means for operating said contact and means for affecting the operation thereof comprising a Wheatstone bridge arrangement having one pair of opposite junctions connected across said circuit and a coil connected across the other opposite junctions, said coil being in inductive relation to said operating means.

12. An electric regulator including regulating contact mechanism, electromagnetic means for operating the same, and a box-like structure entirely enclosing and supporting said mechanism in operative relation to the electromagnetic means.

13. A regulator for a generator having a circuit for supplying a battery, comprising a vibratory contact, magnetic means for operating said contact and means for affecting the operation thereof, comprising a Wheatstone bridge arrangement having one pair of opposite junctions connected across said circuit and a coil connected across the other opposite junctions, said coil being in inductive relation to said operating means, and one arm of said bridge having its effective resistance varied by operation of said contact.

14. A regulator for a generator having a field winding and a circuit for supplying a battery, comprising a vibratory contact, magnetic means for operating said contact and means for affecting the operation thereof comprising a Wheatstone bridge arrangement having one arm including said field winding, one pair of opposite junctions connected across said circuit and a coil connected across the other opposite junctions, said coil being in inductive relation to said operating means.

15. A combined automatic switch and regulator comprising a magnet core with poles at its ends and at an intermediate portion, a switch operating armature carrying flux between the end poles, a current regulating armature carrying flux between an intermediate pole and an end pole, and a voltage regulating armature carrying flux between an intermediate pole and another end pole.

16. An electric regulator including regulating contact mechanism, electromagnetic means for operating the same, a box-like structure entirely enclosing and supporting said mechanism in operative relation to the electromagnetic means, and means for adjusting the operation of the contact mechanism operable from outside of said box-like structure.

17. An electric regulator including regulating contact mechanism, electromagnetic means for operating the same, a box-like structure entirely enclosing and supporting said mechanism in operative relation to the electromagnetic means, and means for adjusting the operation of the contact mechanism operable from outside of said box-like structure, comprising a movable member extending into the interior of said box-like structure and accessible outside said structure.

JOHN L. CREVELING.